United States Patent
Newton

(10) Patent No.: US 10,429,098 B2
(45) Date of Patent: Oct. 1, 2019

(54) TEMPERATURE CONTROLLER

(71) Applicant: LMK THERMOSAFE LIMITED, Haverhill (GB)

(72) Inventor: Mark Newton, Haverhill (GB)

(73) Assignee: LMK THERMOSAFE LIMITED, Haverhill (GB)

( * ) Notice: Subject to any disclaimer, the term of this patent is extended or adjusted under 35 U.S.C. 154(b) by 124 days.

(21) Appl. No.: 15/736,953

(22) PCT Filed: May 27, 2016

(86) PCT No.: PCT/GB2016/051540
§ 371 (c)(1),
(2) Date: Dec. 15, 2017

(87) PCT Pub. No.: WO2017/001815
PCT Pub. Date: Jan. 5, 2017

(65) Prior Publication Data
US 2018/0361180 A1 Dec. 20, 2018

(30) Foreign Application Priority Data
Jun. 30, 2015 (GB) ................................. 1511455.6

(51) Int. Cl.
*F24H 9/20* (2006.01)
*G05D 23/19* (2006.01)
(Continued)

(52) U.S. Cl.
CPC ............... *F24H 9/20* (2013.01); *A62C 3/002* (2013.01); *A62C 3/065* (2013.01); *F24H 9/2021* (2013.01);
(Continued)

(58) Field of Classification Search
None
See application file for complete search history.

(56) References Cited

U.S. PATENT DOCUMENTS 7,454,269 B1 11/2008 Dushane et al.
2014/0031994 A1 1/2014 Pan et al.
(Continued)

FOREIGN PATENT DOCUMENTS

DE 29824435 12/2000
WO WO 030830803 10/2003
WO WO 2013149210 10/2013

OTHER PUBLICATIONS

Search Report in GB1511455.6, UK Intellectual Property Office, dated Dec. 2, 2015.
(Continued)

*Primary Examiner* — Sean Shechtman

(57) ABSTRACT

A temperature controller for a heater for a container for use in hazardous areas and a method of programming such a temperature controller. The method of programming such a temperature controller comprises the steps of writing identification data and parameter data to a memory of a portable token in an area remote from the hazardous area; transporting the token to a position in proximity to the temperature controller in the hazardous area; transmitting, by means of near field communication, the identification data and parameter data stored in the memory of the portable token to a receiver in the temperature controller; comparing the identification data received by the temperature controller with identification data stored in a memory of the temperature controller; and if said comparison of identification data is positive, and updating parameter data stored in the memory of the temperature controller with the parameter data received by the receiver.

20 Claims, 1 Drawing Sheet

(51) Int. Cl.
G05D 23/22 (2006.01)
A62C 3/00 (2006.01)
A62C 3/06 (2006.01)

(52) U.S. Cl.
CPC ..... G05D 23/1905 (2013.01); G05D 23/1931 (2013.01); G05D 23/22 (2013.01); *G05B 2219/25124* (2013.01)

(56) References Cited

U.S. PATENT DOCUMENTS

2014/0217186 A1* 8/2014 Kramer .............. G05D 23/1905 236/1 C
2017/0176963 A1* 6/2017 Goli .................. G07C 9/00007

OTHER PUBLICATIONS

International Search Report and Written Opinion in PCT/GB2016/051540, EPO, dated Sep. 21, 2016.

* cited by examiner

TEMPERATURE CONTROLLER

BACKGROUND a. Field of the Invention

This invention relates to a temperature controller for a heater for a container for use in hazardous areas and to a method of programming such a temperature controller. In particular, this invention relates to a temperature controller for an induction heater or a flexible heating jacket for heating drums, containers, pipes or fittings in hazardous environments in which there is a significant risk of explosion.

b. Related Art

Large volume industrial containers, for example 40 imperial gallon (205 liter) drums or intermediate bulk containers (IBC's) which may have a volume of 1000 liters, are used to store a variety of different materials.

In some circumstances it is necessary or desirable to heat the containers and/or the contents of the containers, for example to decrease the viscosity of a liquid held within the container. It is known to provide a heating jacket or drum heater that surrounds the container and can be controlled to raise the temperature of the container and to maintain the temperature of the contents of the container at the desired temperature.

In some circumstances the contents of the containers may be hazardous or the environment in which the container is being heated is hazardous. In the United Kingdom a hazardous area is defined in The Dangerous Substances and Explosive Atmospheres Regulations 2002 as "a place in which an explosive atmosphere may occur in such quantities as to require special precautions to protect the health and safety of the workers concerned". Equipment and in particular electrical and electronic equipment to be used in such hazardous areas is highly regulated and, in the United Kingdom, is covered by a number of European and British Standards. Within Europe these are covered by EU Directive 94/9/EC.

If containers and their contents are to be heated in a hazardous area there must, therefore, be strict control over the heating process and the equipment that is used. There may be a significant risk of explosion if the container is heated to too high a temperature or if a spark is created by the heating element or any of the components of the temperature controller.

A number of different types of heater for heating larger volume containers in hazardous areas are known.

Some heating jackets and drum heaters comprise an induction heater. These heaters have no heating element and have self limiting temperature control due to the induction process. These induction heaters are, however, only suitable for use with metal containers.

Heating jackets, for example flexible heating jackets, may be used to heat other types of container and these heaters include heating elements and a suitable thermostat, for example an adjustable capillary bulb thermostat. A typical thermostat, however, creates a spark that could ignite an explosive gas or dust and is, therefore, unsuitable for use in a hazardous environment. Options for temperature control in hazardous areas are generally expensive and complicated, and typically need to be located away from the heater in a safe area. In particular, explosion proof thermostats for fixed installations need to be fitted inside very heavy duty die-cast boxes which are not designed to be portable.

Furthermore, traditional thermostats can be slow to react to changes in temperature leading to the possibility of a significant overshoot of the desired operating temperature or set-point. The use of an electronic temperature controller may allow increased control of the temperature around the set-point; however, known controllers are too bulky and heavy to be fitted onto known heating jackets, especially flexible heating jackets.

Another disadvantage of known temperature controllers is that the settings, for example the set-point, are easily changed, which may result in an incorrect temperature being set and the container overheating.

It is, therefore, an object of the present invention to provide an improved temperature controller suitable for use with all types of heater and in hazardous environments.

SUMMARY OF THE INVENTION

According to a first aspect of the present invention there is provided a method of programming a temperature controller for a heater for heating the contents of a container in a hazardous area, the method comprising the steps of:

writing identification data and parameter data to a memory of a portable token in an area remote from the hazardous area;

transporting said token to a position in proximity to the temperature controller in the hazardous area;

transmitting, by means of near field communication, the identification data and parameter data stored in the memory of the portable token to a receiver in the temperature controller;

comparing the identification data received by the temperature controller with identification data stored in a memory of the temperature controller;

if said comparison of identification data is positive, updating parameter data stored in the memory of the temperature controller with the parameter data received by the receiver; and if said comparison is negative, not updating the parameter data stored in the memory of the temperature controller with the parameter data received by the receiver.

The method of the present invention, therefore, allows changes to be made to the settings and parameters of the temperature controller by programming a device in an area remote from the heater and then transporting that device to the hazardous area to make the data transfer using near field communication. This means that the operator who enters the hazardous area does not need to make direct contact with the temperature controller, as well as minimising the time that the operator needs to be in the hazardous area.

By associating identification data with the parameter data, it is possible to store updated settings and parameters for several different temperature controllers on the same portable token. The combination of near field communication and the requirement to verify the identification data, however, means that each temperature controller will be updated with the correct parameter settings, with no further input required by the user of the token.

The comparison of the identification data is preferably positive if the identification data received by the temperature controller from said token matches the identification data stored in the memory. Alternatively a positive comparison may result from the identification data on the portable token being related to the identification data stored in the memory of the temperature controller.

The parameter data may comprise one or more of a first target temperature, a second target temperature, and a pulse width modulation setting.

According to a second aspect of the present invention there is provided a hazardous area temperature controller for a heater for heating the contents of a container and for use in the method according to the first aspect of the invention, the temperature controller comprising:
- a power connection for connecting the temperature controller to a mains power supply;
- a temperature sensor for measuring the temperature of said heater, said container or said contents;
- an electronic circuit comprising:
  - an electronic switch for switching the mains power supply to supply power to said heater;
  - a memory in which is stored identification data and parameter data including a target temperature value;
  - a near field communication receiver configured to receive a near field communication signal including identification data and updated parameter data; and
  - a processor configured to:
    - compare the identification data received by the near field communication receiver with the identification data stored in the memory;
    - update the parameter data stored in the memory with the updated parameter data received by the near field communication receiver if said comparison of identification data was positive;
    - receive a first input temperature value from the temperature sensor corresponding to said measured temperature;
    - compare the first input temperature value with the target temperature value; and
    - output a signal to the electronic switch based on said temperature comparison to control power supplied to said heater; and
- a housing surrounding the electronic circuit, the housing being partially made from metal and including a window made from a material that permits the transmission of near field communication signals therethrough.

In preferred embodiments the electronic switch is a semiconductor switch.

To reduce or avoid the possibility of sparks or arcs, the electronic circuit is preferably covered in a suitable resin or potting compound.

The window of the housing is preferably impact resistant. In preferred embodiments the window is made of glass.

The hazardous area temperature controller may comprise two temperature sensors. In these embodiments the processor is preferably configured to receive the first input temperature value from a first one of the temperature sensors and a second input temperature value from a second one of the temperature sensors, and the processor preferably includes a setting for determining from which one of the temperature sensors the input temperature value is received. Furthermore, the parameter data stored in the memory preferably includes a first target temperature value and a second target temperature value and the processor is configured to compare the first input temperature value with the first target temperature value and/or to compare the second input temperature value with the second target temperature value.

One or both of the temperature sensors may be a thermocouple. In preferred embodiments the hazardous area temperature controller further comprises a reference junction temperature sensor and the processor is configured to receive a reference input temperature value from the reference junction temperature sensor, compare the reference input temperature value with an overload temperature value stored in the memory, and output a signal to the electronic switch to open said switch when the reference input temperature value is greater than the overload temperature value.

In particularly preferred embodiments the hazardous area temperature controller further comprises a manual input device including a switch, button or touch screen. The manual input device is configured to permit a user to input or change one or more of the parameter data stored in the memory. The manual input device may be configured to allow the user to input or change the same parameter data as stored on the portable token or different parameter data or settings of the temperature controller.

The temperature controller may comprise a display for displaying the input temperature value from the first and/or the second temperature sensor and one or more of the parameter data stored in the memory. This allows a user to see the current setting of a parameter of the temperature controller and the current temperature of the heater or the container being heated.

The parameter data in the memory of the temperature controller may include a pulse width modulation parameter. In these embodiments the processor is configured to send a pulse width modulation signal to the electronic switch based on the pulse width modulation parameter, so as to control a duty cycle of the switch.

In order to allow data to be sent from the temperature controller to the portable token, i.e. to allow two way data exchange between the controller and the token, the temperature controller may comprise a near field communication transmitter.

According to a third aspect of the present invention there is provided a hazardous area temperature control system for a heater for use in the method according to the first aspect of the invention, the system comprising:
- a temperature controller according to the second aspect of the invention; and
- a portable programmable token comprising:
  - a memory in which is stored identification data and parameter data; and
  - a near field communication transmitter configured to transmit the identification data and parameter data from the token to the near field communication receiver of the temperature controller.

In order to allow data to be sent from the temperature controller to the portable token, i.e. to allow two way data exchange between the controller and the token, the token may comprise a near field communication receiver.

In preferred embodiments the token comprises input means for inputting identification data and parameter data into the memory of the token. The token may, for example, be a mobile telephone. In other embodiments the token may be a smart card.

According to a fourth embodiment of the present invention there is provided a container heater comprising a hazardous area temperature controller according to the second aspect of the invention, and a heating element, said temperature controller being electrically connected to the heating element.

BRIEF DESCRIPTION OF THE DRAWINGS

The invention will now be further described by way of example only and with reference to the accompanying drawings, in which.

DETAILED DESCRIPTION

Figure 1:
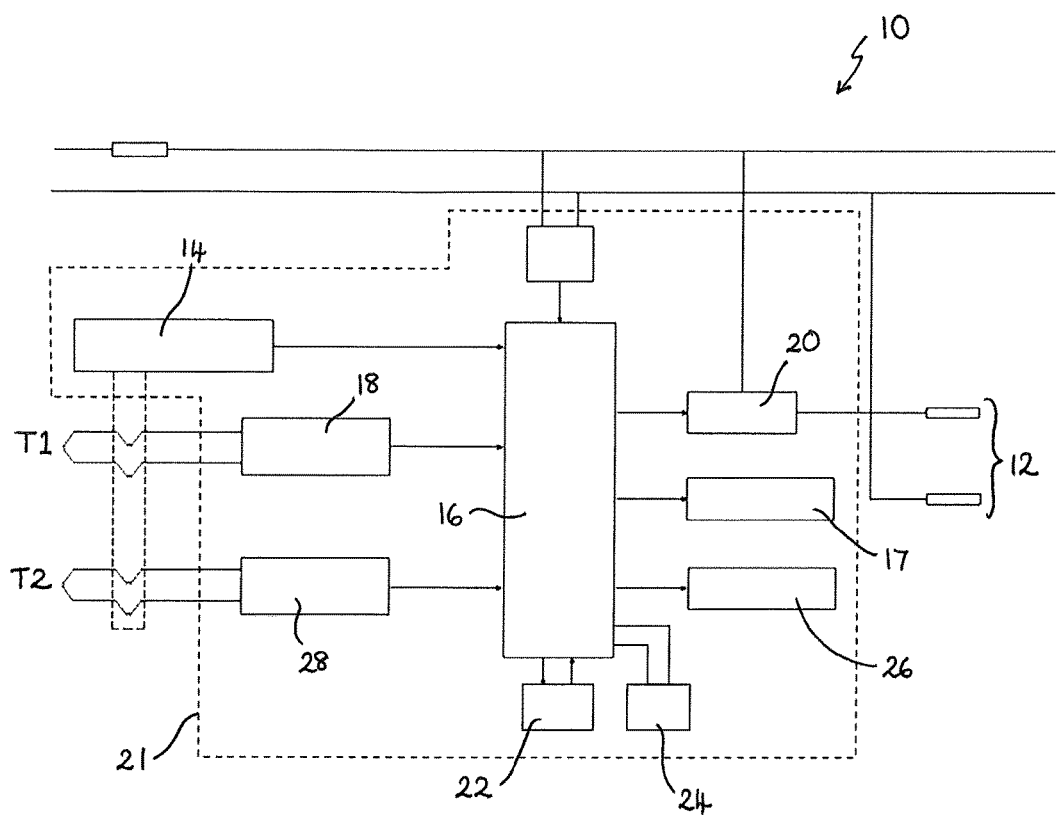
FIG. 1 is a block diagram of a temperature controller according to a preferred embodiment of the present invention.

The present invention concerns temperature controllers for use with heaters for large containers such as drums, totes, barrels and intermediate bulk containers (IBCs). The containers will typically have a capacity of between 25 liters and 1000 liters. The heaters may also be used to heat sections of pipework with a similar internal volumetric capacity. The heaters may be in the form of a flexible heating jacket or an induction heater, to which the temperature controller is directly connected. The temperature controller of the present invention is suitable for use in hazardous areas. Hazardous areas are areas in which there are flammable liquids, vapours, gases or combustible dusts that could present a fire or explosion hazard.

A temperature control system 2 of the present invention includes a temperature controller 10 that is electrically connected to a heater 4 for heating a container 6. Parameters stored in a memory 17 of the temperature controller 10 are adjusted and set by a user of the system 2 to control the operation of the heater 4.

The parameters of the controller 10 may be changed by signals received from a portable token 32. The token 32 is programmed with parameter data remote from the controller 10. A near field communication transmitter 30 in the token 32 is then used to transmit the parameter data to the temperature controller 10 which includes a corresponding near field communication receiver 24. The parameters of the temperature controller 10 may, therefore, be changed by bringing the token 32 into close proximity to the controller 10, typically closer than 20 cm, but without direct contact between the token 32 and the controller 10 or between the user and the controller 10.

FIG. 1 is a block diagram of a temperature controller 10 according to a preferred embodiment of the present invention. The temperature controller 10 is designed to be connected to a heater for heating a container and to control the power supplied to a suitable heating element or load 12. The heating element 12 will typically be powered by mains voltage electricity, which in the United Kingdom is 240 V AC. The temperature controller 10 is, therefore, configured to be connected to a voltage source of up to 264 V AC.

The temperature controller 10 comprises a temperature sensor T1 that is located on or attached to an inside surface of the heater 4, which may be in the form of a heating jacket or drum heater, that surrounds the container 6 being heated. In preferred embodiments, the temperature sensor T1 is a thermocouple and the controller 10 further comprises a suitable reference junction thermometer 14 for cold junction compensation as is known in the art. The temperature controller 10 and temperature sensor T1 are preferably configured to measure and monitor temperatures in the range of −40° C. to 200° C.

Temperature measurement data from the temperature sensor T1 is input to a processor or microcontroller 16 via a suitable sensor control circuit 18. The power or current supplied to the heating element 12 is then controlled by the processor 16 and a suitable semiconductor switch 20, with reference to a first target temperature that is stored in a memory 17 of the controller 10. The first target temperature or first set-point is the desired temperature of the heater and will be set by a user of the temperature controller 10.

The semiconductor or electronic switch 20 is capable of switching a current of up to 45 A at 240 V AC. Heat generated by the electronic switch 20 is dissipated using a suitable heat sink, such as a convection heat sink. In preferred embodiments the electronic switch 20, in the form of a semiconductor triac, is optically isolated from the processor 16. The electronic switch or triac is also, preferably, encapsulated in a plastics material or resin to reduce the risk of sparks from the switch.

The temperature controller 10 includes two input means 22, 24 that may be used to input the first target temperature or first set-point. A first of these input means 22 is a manual input device 22 such as a keypad 23 with push buttons or a touch screen device. A second of these input means 24 is a near field communication receiver 24. The controller also, preferably, includes a display 26 for displaying stored and current parameters, such as temperature. The display 26 may be a light emitting diode (LED) display or a liquid crystal display (LCD).

A user may adjust the set-point using the push buttons or touch screen of the manual input device 22. The display 26 will usually display the temperature measured by the temperature sensor T1 and, accordingly, the input device 22 may include a button that allows the set-point temperature to be displayed. It will be appreciated that if the set-point is being adjusted then the display 26 will typically be configured to display the set-point temperature automatically during this operation.

In preferred embodiments the temperature controller 10 includes a second temperature sensor T2 that is located within the container being heated such that the temperature sensor T2 measures the temperature of the contents of the container. This is of particular advantage if the materials being heated are highly viscous or are slow to melt. The temperature sensor T2 will typically be a thermocouple and will also be connected to the reference junction thermometer 14 for cold junction compensation.

Temperature measurement data from the temperature sensor T2 is input to the processor 16 via a suitable sensor control circuit 28. The temperature sensor T2 is preferably configured to measure temperatures in the range of −40° C. to 200° C.

The processor 16 may be programmed to control the power or current supplied to the heating element 12 based on the temperature measurement data from the temperature sensor T2. In particular, the temperature measurement data from the temperature sensor T2 may be compared to a second target temperature or second set-point that is stored in the memory 17 of the controller 10. As described above in relation to the first target temperature, the second target temperature or second set-point may be input to the processor by the first or second input means 22, 24.

In embodiments in which the temperature controller 10 includes two temperature sensors, T1 and T2, the processor 16 may be programmed to control the power supplied to the heating element 12 based on the input from the first temperature sensor T1, the second temperature sensor T2 or both temperature sensors.

Furthermore, the manual input device 22 may include one or more buttons that allow a user to select the source of the temperature measurement data that is used as an input to the processor 16.

In embodiments in which the temperature sensors T1, T2 are thermocouples, the cables connecting the thermocouples to the sensor control circuits 18, 28 are preferably shielded cables.

The processor 16 may be programmed with a maximum ratio of the measured temperature data from sensor T1 and sensor T2, i.e. a maximum T1/T2 value. This will typically be set by the manufacturer and cannot be adjusted by the user. The processor 16 may also be programmed with a limit value of the measured temperature data from T1 and/or T2. If the measured temperature data from T1 or T2 reaches or exceeds this pre-set limit value, then the electronic switch 20 is opened and the power supplied to the load circuit 12 is interrupted, to prevent overheating of the container and its contents.

The processor 16, memory 17, sensor control circuits 18, 28, and semiconductor switch 20 are all part of an electronic circuit 21 of the controller 10. In preferred embodiments, the electronic circuit 21 also includes the reference junction thermometer 14, such that the reference junction thermometer 14 is effectively measuring the temperature of the electronic circuit 21. Accordingly, the processor 16 may also be programmed with a circuit temperature limit value. If the temperature measured by the reference junction thermometer 14 reaches or exceeds this limit value, then the electronic switch 20 is opened and the power supplied to the load circuit 12 is interrupted, to prevent overheating of the electronic circuit 21.

To avoid any sparks or arcs between electronic components, the electronic circuit 21 is preferably fully covered in a suitable resin or potting compound. This is of particular importance if the temperature controller 10 is to be used in a hazardous area. In some embodiments of the invention, the potting compound may be a two part catalytic silicone compound with a high temperature coefficient of conductivity greater than 0.024 W/mK and low flammability, as defined by international testing standards such as UL 94-V0.

In some embodiments of the invention, in addition to the temperature control described above, the processor 16 is also programmed with a pulse width modulation (PWM) function. In these embodiments the switching of the electronic switch 20, and therefore the power supplied to the heating element 12, is controlled by a PWM setting in addition to the target temperature setting described above. This permits greater control of the heating element 12, which is of particular advantage when the heating element 12 is being used to heat containers containing highly temperature sensitive chemicals or fluids.

The PWM function allows a user to effectively set the duty cycle or the percentage of the time that power is supplied to the heating element within a given period of time, i.e. the pulse duration of the electronic switch 20, by inputting a PWM percentage. A user may adjust the PWM percentage using the push buttons or touch screen of the manual input device 22.

A control, for example a switch or a button, may be provided to allow the manual input device 22 to be locked so that pressing any buttons of the manual input device 22 will not cause the set-point or PWM percentage to be changed, thereby preventing accidental adjustment of these values. This same control, or a different control, may be provided to allow the manual input device 22 to be subsequently unlocked to allow a user to change settings of the processor 16 or parameters stored in the memory 17 of the controller 10 by pressing the buttons or the touch screen of the manual input device 22.

In certain circumstances, for example in hazardous areas, it is advantageous to be able to adjust the settings of the processor 16 without using the manual input device 22. In these circumstances the parameter data stored in the memory 17 of the electronic circuit 21 may be updated using data received by the near field communication receiver 24. This allows the temperature controller 10 to be controlled without any contact with the controller 10 itself.

The near field communication receiver 24 is configured to receive input parameter data from a near field communication transmitter 30 that is separate from the temperature controller 10.

Figure 2:
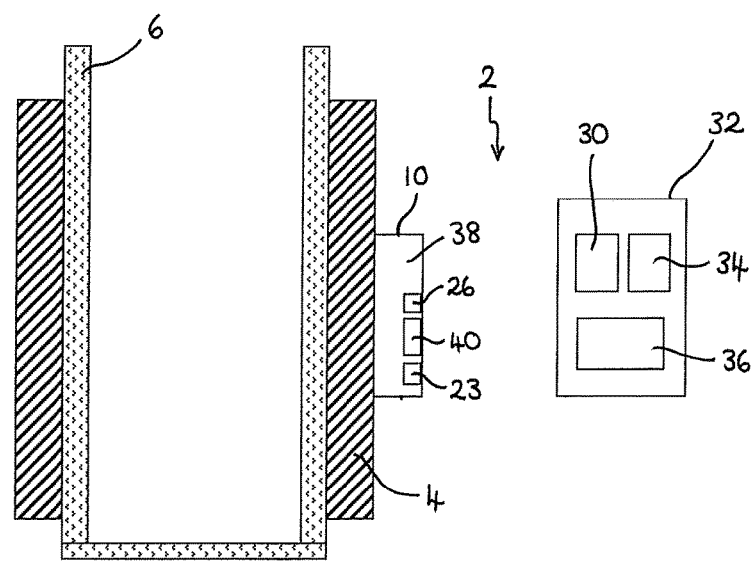
FIG. 2 is a schematic drawing of a temperature control system according to a preferred embodiment of the present invention, including the temperature controller of FIG. 1.

The near field communication transmitter 30 is preferably contained within a portable token 32, as illustrated in FIG. 2. The portable token 32 is preferably sized such that it can be carried by a user, and the token 32 may be in the form of a mobile device such as a mobile telephone or a smart card.

The portable token 32 further includes a memory 34 in which the parameter data is stored. The parameter data includes one or more pieces of data to set or update the following parameters in the processor 16 or the memory 17 of the electronic circuit 21:

Lock or unlock the manual input device 22
Enable or disable the PWM function
Enable or disable the set-point temperature control function
Value of the first target temperature/first set-point
Value of the second target temperature/second set-point
Value of the PWM percentage The parameter data may also include data to change the hysteresis of the set-point temperature control function, i.e. the lower and upper temperature values at which the power supplied to the heating element 12 is switched on and off respectively to maintain the required set-point temperature. For example the lower and upper temperatures may be set at 2° C. below and 2° C. above the set-point temperature respectively.

In preferred embodiments the parameter data can only be used to change the settings of the processor 16 or the data stored in the memory 17 that could also be changed via the manual input device 22. The settings of the processor 16 or the data stored in the memory 17 that are programmed during manufacture of the temperature controller 10, and cannot otherwise be altered by a user, cannot be altered using the portable token 32.

In some embodiments the parameter data of the portable token 32 may be used to set limits or ranges of allowable values for the first target temperature/first set-point, the second target temperature/second set-point and/or the PWM percentage. For example, the parameter data may set a lower limit of the first target temperature as 100° C. and an upper limit of the first target temperature as 180° C. The setting of these limits then prevents the first target temperature being set to a value less than 100° C. or greater than 180° C.

In some embodiments data exchange between the portable token 32 and the temperature controller 10 is only one way, i.e. data is transmitted by the portable token 32 and received by the temperature controller 10, so as to update the settings of the processor 16 or the data stored in the memory 17.

In other embodiments it may be desirable to enable two-way data exchange between the portable token 32 and the temperature controller 10. In these embodiments the portable token 32 further includes a near field communication receiver and the temperature controller 10 further includes a near field communication transmitter. In these embodiments, as well as parameter data being transmitted from the token 32 and being received by the controller 10, recorded data may be transmitted by the controller 10 and received by the token 32. This recorded data may include current parameter settings or archived data including previous temperature measurements and heating profiles.

The portable token 32 may include input means 36 to allow a user to program the token 32 directly, for example the token 32 may be part of a mobile telephone that includes a keypad. Alternatively the token 32 may be programmed by a computer, mobile telephone or other suitable read/write device that is separate from the token 32 and is also located remote from the temperature controller 10. In embodiments in which the token 32 is programmed by a remote read-write device, the token 32 will comprise suitable receiving means for receiving the parameter data from the read-write device.

The portable token 32 is preferably configured so that it is only programmable by authorised persons, for example requiring the input of a password or keycode.

Once the token 32 has been programmed, however, any person may then transport the token 32 to the temperature controller 10 on the heater. Once the token 32 is within detectable range of the near field communication receiver of the controller 10, the data is transmitted automatically from the token 32 to the controller 10.

This is of particular benefit when the heater and therefore the temperature controller 10 is located in a hazardous area. Parameters may be established and the portable token 32 programmed in a safe area remote from the temperature controller 10, and then the token 32 may simply be carried into the hazardous area and brought into close proximity to the controller 10 to allow the transfer of data and the update of the settings of the controller 10.

Alternatively, the user may have to press a button or switch on the token 32 to activate the transmission of the data.

The memory 17 of the electronic controller 10 includes identification data that is unique to that controller 10. The data stored in the memory 34 of the token 32 also includes, along with the parameter data, identification data that is used to identify a particular temperature controller 10. In use, when a token 32 is brought into proximity to a temperature controller 10, the near field communication receiver 24 receives the identification data and the parameter data from the token 32. The processor 16 compares the received identification data with the identification data stored in the memory 17. If the comparison returns a positive result, i.e. the received identification data corresponds to or matches the controller's identification data then the processor 16 updates the parameter data in the memory 17 using the parameter data received from the token 32. If the comparison returns a negative result, then the processor 16 ignores the received parameter data.

The identification data, therefore, permits selective communication with a single temperature controller 10. This is particularly useful in situations in which a number of temperature controllers may be connected to neighbouring heaters in a line or group of containers. The inclusion of the identification data means that the token 32 is only able to change the parameters of the selected controller 10, and will not affect the parameters of any of the neighbouring controllers 10, even if the token 32 is placed in close proximity to one of the other controllers 10.

In situations in which the temperature controller 10 is to be used in a hazardous area, i.e. one in which there is a risk of explosion, the temperature controller 10 must be surrounded by a suitable housing 38. The housing 38 is designed to screen electrical signals emitted from the controller 10 that may affect other electrical or electronic devices in the area and to prevent external stray electrical signals from interfering with the temperature controller 10. The housing 38 preferably comprises a metal box within which the electronic circuit 21 of the controller 10 is housed.

The metal box acts as a heat sink for the electronic controller 10 as well as a screen for electromagnetic radiation. The metal box is preferably made of stainless steel.

In order to allow the near field communication signals to pass between the token 32 and the receiver 24, a window 40 is provided in the housing 38. The window 40 will typically be made from glass or another suitable ceramic or plastics material that permits near field communications signals to be transmitted through the window 40 between the token 32 and the receiver 24. The material from which the window is made should also be impact resistant. The degree of resistance to impact may vary between embodiments; however, in preferred embodiments the window should be designed to withstand breaking when hit with a steel mass of 1 kg falling from a height of at least 0.4 m.

In addition to near field communication signals from the token 32, however, the window 40 will also permit other stray electromagnetic signals to pass through the housing 38 from the surroundings to the electronic circuit 21. It is, therefore, necessary to incorporate into the electronic circuit 21 of the controller 10 suitable signal filtering. This filtering is used to filter out signals having frequencies other than that of the near field communication device, which will typically be around 13.56 MHz, so that they do not affect the circuitry.

The design and layout of the near field communication antenna of the receiver 24 is also, preferably, optimised to reduce the interference or noise from stray electromagnetic signals and to permit suitable amplification of the near field communication signals received from the token 32.

The electronic circuit 21 itself will also produce unwanted electromagnetic signals, creating noise or interference. It is, therefore, also necessary to include suitable filtering to minimise the signals emitted through the window 40 and/or along the mains power cable. A number of filters, such as passive filters, are well known to a person skilled in the art.

The present invention therefore provides an improved temperature controller suitable for use with all types of heater and in hazardous environments.

The invention claimed is:

1. A method of programming a temperature controller for a heater for heating the contents of a container in a hazardous area, the method comprising the steps of:
    writing identification data and parameter data to a memory of a portable token in an area remote from the hazardous area;
    transporting said portable token to a position in proximity to the temperature controller in the hazardous area;
    transmitting, by means of a near field communication method, the identification data and parameter data stored in the memory of the portable token to a receiver in the temperature controller;
    comparing the identification data received by the temperature controller with identification data stored in a memory of the temperature controller;
    if said comparison of identification data is positive, updating parameter data stored in the memory of the temperature controller with the parameter data received by the receiver; and
    if said comparison is negative, not updating the parameter data stored in the memory of the temperature controller with the parameter data received by the receiver.

2. The method as claimed in claim 1, wherein the comparison is positive if the identification data received by the temperature controller from said portable token matches the identification data stored in the memory of the temperature controller.

3. The method as claimed in claim 1, wherein the parameter data comprises one or more of a first target temperature, a second target temperature, and a pulse width modulation setting.

4. The method of claim 1, wherein said hazardous area temperature controller for said heater comprises:
   a power connection, for connecting the temperature controller to a mains power supply;
   a temperature sensor, for measuring the temperature of one or more of said heater, said container or said contents of said container;
   an electronic circuit comprising:
      an electronic switch, for switching the mains power supply to supply power to said heater;
      a memory, in which is stored said identification data and said parameter data including a target temperature value;
      a near field communication receiver, configured to receive a near field communication signal from said portable token including said identification data and said parameter data; and
      a processor configured to:
         compare the identification data received from the portable token by the near field communication receiver with the identification data stored in the memory of the temperature controller;
         update the parameter data stored in the memory of the temperature controller with the updated parameter data received by the near field communication receiver if said comparison of identification data was positive;
         receive a first input temperature value from the temperature sensor corresponding to said measured temperature;
         compare the first input temperature value with the target temperature value; and
         output a signal to the electronic switch based on said temperature comparison to control power supplied to said heater; and
   a housing surrounding the electronic circuit, the housing being partially made from metal and including a window made from a material that permits the transmission of near field communication signals therethrough.

5. The hazardous area temperature controller as claimed in claim 4, wherein the electronic switch is a semiconductor switch.

6. The hazardous area temperature controller as claimed in claim 4, wherein the electronic circuit is covered in a suitable resin or potting compound.

7. The hazardous area temperature controller as claimed in claim 4, wherein the window of the housing is impact resistant.

8. The hazardous area temperature controller as claimed in claim 4, comprising two temperature sensors and wherein the processor is configured to receive the first input temperature value from a first one of the temperature sensors and a second input temperature value from a second one of the temperature sensors, and wherein the processor includes a setting for determining from which one of the temperature sensors the input temperature value is received.

9. The hazardous area temperature controller as claimed in claim 8, wherein the parameter data stored in the memory of the temperature controller includes a first target temperature value and a second target temperature value, and wherein the processor is configured to compare the first input temperature value with the first target temperature value and/or to compare the second input temperature value with the second target temperature value.

10. The hazardous area temperature controller as claimed in claim 8, wherein one or both of the temperature sensors is a thermocouple.

11. The hazardous area temperature controller as claimed in claim 4, further comprising a reference junction temperature sensor, and wherein the processor is configured to:
   receive a reference input temperature value from the reference junction temperature sensor;
   compare the reference input temperature value with an overload temperature value stored in the memory of the temperature controller; and
   output a signal to the electronic switch to open said switch when the reference input temperature value is greater than the overload temperature value.

12. The hazardous area temperature controller as claimed in claim 4, further comprising a manual input device selected from the group of manual input devices consisting of a switch, a button and a touch screen, and wherein the manual input device is configured to permit a user to input or change one or more of the parameter data stored in the memory of the temperature controller.

13. The hazardous area temperature controller as claimed in claim 8, further comprising a display, for displaying the input temperature value from at least one of the first and the second temperature sensor and one or more of the parameter data stored in the memory of the temperature controller.

14. The hazardous area temperature controller as claimed in claim 4, wherein the parameter data in the memory of the temperature controller includes a pulse width modulation parameter, and wherein the processor is configured to send a pulse width modulation signal to the electronic switch based on the pulse width modulation parameter, so as to control a duty cycle of the switch.

15. The hazardous area temperature controller as claimed in claim 4, further comprising a near field communication transmitter.

16. A hazardous area temperature control system for a heater, the system comprising:
   the temperature controller as claimed in claim 4, and wherein said portable token comprises:
   a portable programmable token comprising:
      a memory in which is stored said identification data and said parameter data; and
      a near field communication transmitter, configured to transmit the identification data and the parameter data from the portable programmable token to the near field communication receiver of the temperature controller.

17. The hazardous area temperature control system as claimed in claim 16, wherein the portable programmable token further comprises a near field communication receiver.

18. The hazardous area temperature control system as claimed in claim 16, wherein the portable programmable token further comprises input means, for inputting said identification data and said parameter data into the memory of the portable programmable token.

19. The hazardous area temperature control system as claimed in claim 16, wherein the portable programmable token is selected from the group of portable programmable devices consisting of a mobile telephone and a smart card.

20. A container heater comprising a hazardous area temperature controller as claimed in claim 4, and a heating element, wherein said temperature controller is electrically connected to the heating element.

* * * * *